United States Patent [19]

Grubb

[11] Patent Number: 5,226,049
[45] Date of Patent: Jul. 6, 1993

[54] OPTICAL FIBER RARE EARTH ION UPCONVERSION LASER SYSTEM

[75] Inventor: Stephen G. Grubb, DuPage, Ill.

[73] Assignee: Amoco Corporation, Chicago, Ill.

[21] Appl. No.: 832,006

[22] Filed: Feb. 6, 1992

[51] Int. Cl.$^5$ .............................................. H01S 3/17
[52] U.S. Cl. .................................... 372/6; 372/40; 372/75
[58] Field of Search ............... 372/6, 75, 70, 71, 40, 372/41, 21, 5

[56] References Cited

U.S. PATENT DOCUMENTS

| | | | |
|---|---|---|---|
| 4,782,491 | 11/1988 | Snitzer | 372/6 |
| 4,847,850 | 7/1989 | Kafka et al. | 372/71 |
| 4,967,416 | 10/1990 | Esterowitz et al. | 372/6 |
| 5,067,134 | 11/1991 | Oomen | 372/6 |
| 5,084,890 | 1/1992 | Brierley | 372/40 |
| 5,140,456 | 8/1992 | Huber | 372/6 |

FOREIGN PATENT DOCUMENTS

2227359  7/1990  United Kingdom .................. 372/6

Primary Examiner—Georgia Y. Epps
Attorney, Agent, or Firm—Stephen G. Mican

[57] ABSTRACT

Methods and appartus for upconverting laser sources and amplifiers that use solid state components throughout and achieve such operation with a continuous or quasi-continuous single band infrared pumping source using successive energy transfers between the pumping radiation and activator in the host of the lasant upconversion material under ordinary operating conditions.

63 Claims, 3 Drawing Sheets

OPTICAL FIBER RARE EARTH ION UPCONVERSION LASER SYSTEM

BACKGROUND OF THE INVENTION

This invention relates to laser sources and amplifiers that produce coherent radiation that has a shorter wavelength than the wavelength of the pumping radiation through an upconversion process, and more particularly to methods and apparatus for such upconverting laser sources and amplifiers that operate with a rare earth doped solid state lasing medium that may be pumped with infrared radiation under ordinary ambient temperature conditions to provide upconverted laser radiation in the blue portions of the optical spectrum.

Laser systems that produce wavelengths in the shorter wavelengths of the portion of the optical spectrum are highly desirable for a variety of applications. These applications include laser based video display systems and optical systems wherein the higher resolutions afforded by short optical wavelengths are important, such as optical storage systems.

Although laser systems have been developed that produce outputs in the shorter wavelengths of the optical spectrum, the value of such systems have been diminished by one or more factors that include high cost, critical alignment and high maintenance. For instance, rare fas ion lasers have both a high purchase price and a high degree of maintenance. Frequency doubling or summing lasers that employ a nonlinear element require critical alignment and high maintenance.

A laser source or amplifier that uses solid state components throughout is a desirable configuration for a low cost, low maintenance system, but such lasers have never been able to achieve operation in the shorter wavelengths of the optical spectrum under normal ambient temperature operating conditions. Furthermore, the prior art has not been able to achieve such operation with a continuous or quasi-continuous pumping source.

SUMMARY OF THE INVENTION

The invention comprises a solid state laser system with a lasant material that comprises a host doped with an activator material that produces coherent radiation in the shorter wavelengths of the optical spectrum when pumped by a single band infrared pumping source that provides radiation within the range of approximately 1100 to 1300 nanometers. The infrared pumping source conveniently comprises a solid state infrared laser source such as a laser diode.

In the preferred embodiment, for a source of optical radiation, the invention comprises an upconversion process for generating sustained, relatively short wavelength, substantially coherent radiation in the optical spectrum from energy supplied by relatively long infrared radiation under ambient operating conditions, comprising the steps of: circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level; recirculating radiation that has a wavelength substantially shorter than said infrared radiation from said active lasant material that is produced by the radiative decay of the energy state of said activator ions in said highest level back to said ground level to stimulate development of relatively short wavelength coherent radiation; and extracting at least said a portion of said relatively short wavelength coherent radiation that passes through said lasant material.

In the preferred embodiment, for an amplifier of optical radiation, the invention comprises an upconversion process for amplifying sustained, relatively short wavelength, substantially coherent radiation in the optical spectrum from energy supplied by relatively long infrared radiation under ambient operating conditions, comprising the steps of: circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level; injecting relatively coherent radiation that has a wavelength substantially shorter than said infrared radiation into said active lasant material to stimulate production of additional relatively short wavelength coherent radiation that is produced by the radiative decay of the energy state of said activator ions in said highest level back to said ground level; and extracting said relatively short wavelength coherent radiation that passes through said lasant material.

DESCRIPTION OF THE INVENTION

Figure 1:
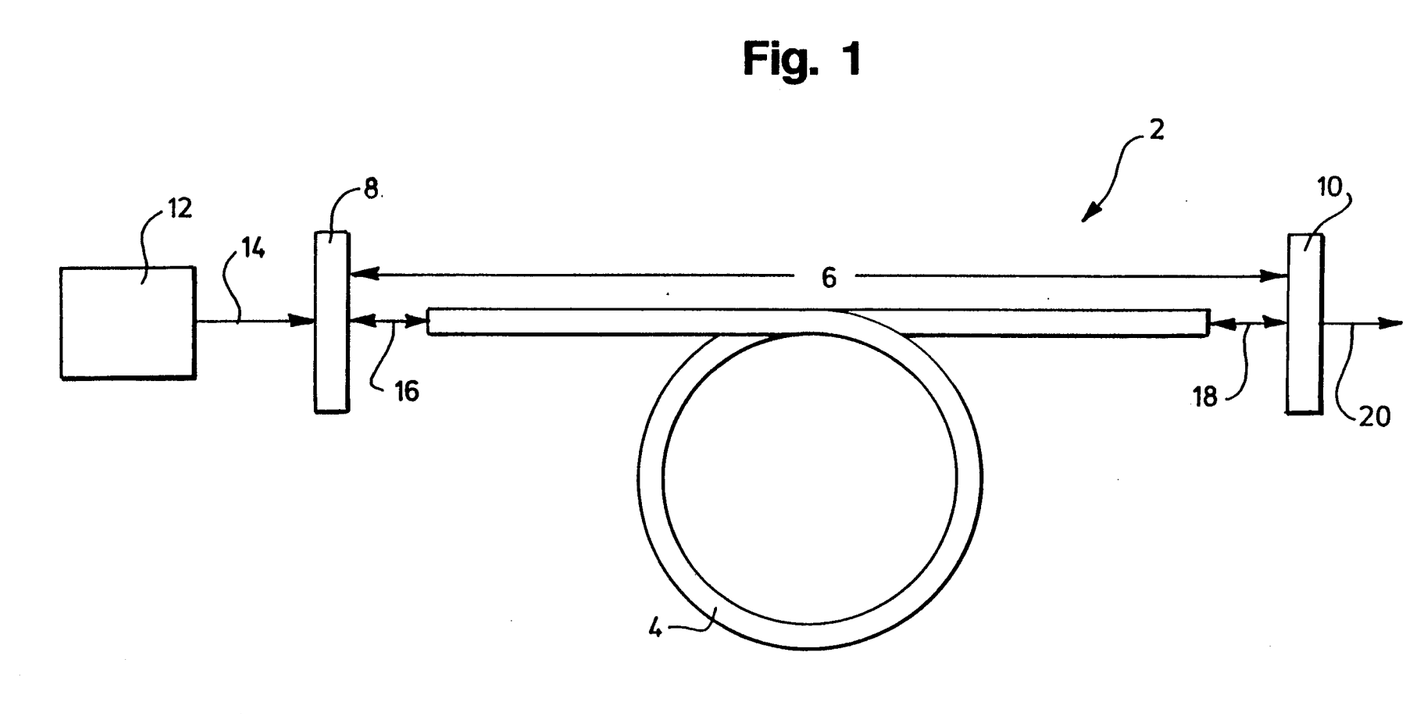
FIG. 1 is a schematic diagram of a laser source system that is suitable for incorporating the present invention.

Referring to the drawings, wherein reference characters designate like or corresponding parts throughout the views, FIG. 1 is a schematic diagram of a laser system 2 that is suitable for incorporating the present invention. The laser system 2 comprises a means for circulating radiant energy 4, within a means for recirculating radiant energy 6, preferably an optical cavity that is formed between a reflector 8 and an output coupler 10. The means for circulating 4 preferably comprises an optical fiber host, such as a fluoride, telluride or germanate-containing optical fiber. A fluoride-containing optical fiber is most satisfactory for this application.

The means for circulating 4 also comprises a rare earth activator material that is preferably doped in the host. The activator comprises a concentration of trivalent thulium or holmium ions within the host. In the case of an optical fiber host, the concentration of activator ions is within the core of the fiber. When thulium ions are chosen as the activator, the concentration of thulium as a percentage of available rare earth sites in the host is in the range of 0.01 to 1.0 percent, preferably between approximately 0.05 and 0.5 percent, and ideally approximately 0.1 percent when the host comprises a fluoride-containing optical fiber host.

The laser system 2 also comprises a substantially single band pumping source 12 that comprises a source of at least quasicontinuous optical pumping radiation having at least one wavelength suitable for pumping the means for circulating 4, this wavelength being in the infrared region of the electromagnetic spectrum. The pumping radiation provided by the pumping source 12 has a wavelength in the range of 1080 to 1300 nanometers, preferably between approximately 1085 and 1185 nanometers, and ideally the wavelength is approximately 1120 nanometers. Ideally, the pumping source 12 comprises a laser diode with an output spectrum within this range of wavelengths.

The pumping radiation produced by the pumping source 12 passes through the reflector 8 from an optical path 14 and penetrates the means for recirculating 6 along an optical path 16 to impinge at least one surface of the means for circulating 4. To this end, the reflector 8 is highly reflective at lasing wavelengths for which the laser system 2 is adjusted to provide coherent output radiation. If non-resonant pumping is desired, the reflector 8 is relatively transparent for wavelengths corresponding to the pumping radiation. If resonant pumping is desired, for instance, when the means for pumping is weakly absorbant for the pumping radiation, the reflector 8 is sufficiently reflective for wavelengths corresponding to the pumping radiation.

The pumping radiation that circulates through the means for circulating 6 transfers energy to at least a portion of the activator ions in the means for circulating 6 until it exits the means for circulating 6 along an optical path 18. The energy transferred to the activator ions increases their energy state to from a ground energy level to a highest energy level, whereby radiation of at least one wavelength substantially shorter than the pumping radiation is developed when the energy state of at least some of the activator ions radiatively decays from the highest level back down to the ground level.

The output coupler 10 is relatively reflective for the shorter wavelength developed by the activator ions through radiative decay of the energy state of the activator ions, so that a large proportion of the energy at this wavelength is recirculated back through the means for recirculating 6. The reflector 8 is highly reflective for this wavelength, so that the radiation developed by the activator ions through radiative decay of the energy state of the activator ions recirculates back through the means for recirculating 6. This radiation stimulates other activator ions that have energy states at the highest level to radiatively decay in phase with the recirculated short wavelength emission, thereby developing substantially coherent short wavelength radiation.

Since the output coupler 10 is less than totally reflective, at least a portion of the substantially coherent shorter wavelength radiation passes through the output coupler 10 along an output path 20. The remainder of the substantially coherent shorter wavelength radiation is recirculated through the means for recirculating 6 to stimulate the development of additional substantially coherent shorter wavelength radiation.

Figure 2:
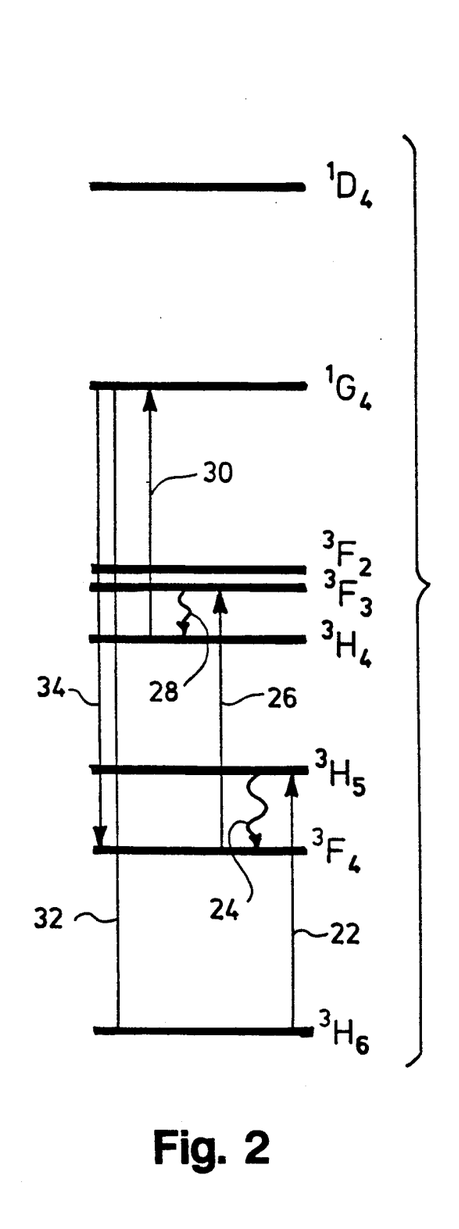
FIG. 2 is an energy state diagram illustrating the upconversion process using thulium activator ions.

FIG. 2 is an energy level diagram that shows how the present invention produces upconversion action with three successive transfers of energy from the infrared pumping radiation to thulium activator ions that are doped in the means for circulating 4. When the wavelength of the pumping radiation from the pumping source 12 along the optical path 14 is adjusted to be in the range of approximately 1080 to 1300 nm, a first transfer of energy from the infrared pumping radiation increases the energy state of at least some of the thulium ions in the means for circulating 4 from the $^3H_6$ ground level to the $^3H_5$ level by absorption of the pumping radiation, as represented by a vector 22.

The energy state of at least a portion of the thulium ions at the $^3H_5$ level then non-radiatively decays down to the $^3F_4$ level. as represented by a wavy vector 24. In a second transfer of energy from the infrared pumping radiation to the activator ions, the energy state of at least some of the thulium activator ions at the $^3F_4$ level is raised to the $^3F_3$ level, as represented by a vector 26. The energy state of at least a portion of the thulium ions at the $^3F_3$ level then non-radiatively decays down to the $^3H_4$ level, as represented by a wavy vector 28. In a third transfer of energy from the infrared pumping radiation to the activator ions, the energy state of at least a portion of the thulium ions at the $^3H_4$ level is then raised to the $^1G_4$ level, as represented by a vector 30. The energy state of at least a portion of the thulium ions at the $^1G_4$ level then radiatively decays, thereby producing the shorter wavelength radiation.

The radiative decay of the energy state of at least a portion of the thulium ions from the $^1G_4$ level may occur down to the $^3H_6$ ground level, as represented by a vector 32, in which case the wavelength of the shorter wavelength radiation is approximately 480 nanometers, or the radiative decay may only be down to the $^3F_4$ state, as represented by a vector 34, in which case the wavelength of the shorter wavelength radiation is approximately 650 nanometers. Thus, this upconversion process involves a mechanism that is capable of producing a plurality of wavelengths that are shorter than that of the pumping radiation.

Figure 3:
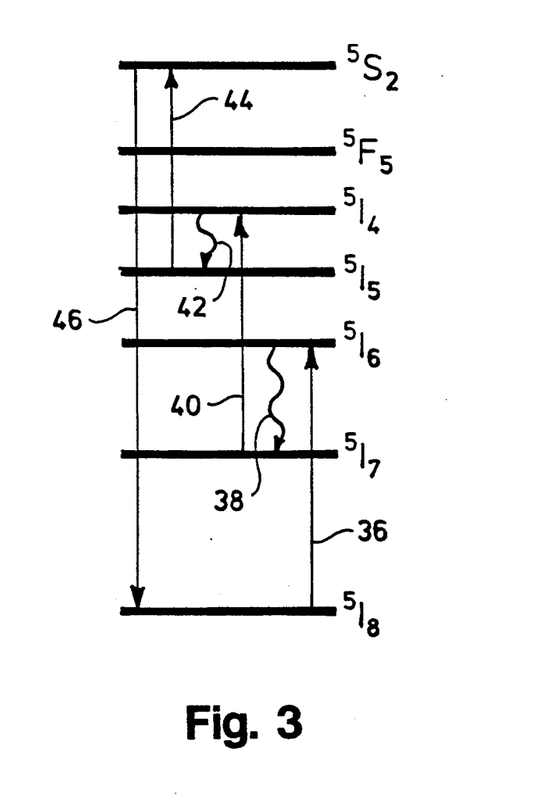
FIG. 3 is an energy state diagram illustrating the upconversion process using thulium activator ions.

FIG. 3 is an energy level diagram that shows how the present invention produces upconversion action with three successive transfers of energy from the infrared pumping radiation to holmium activator ions that are doped in the means for circulating 4. When the wavelength of the pumping radiation from the pumping source 12 along the optical path 14 is adjusted to be in the range of approximately 1080 to 1300 nm, a first transfer of energy from the infrared pumping radiation increases the energy state of at least some of the holmium ions in the means for circulating 4 from the $^5I_8$ ground level to the $^5I_6$ level by absorption of the pumping radiation, as represented by a vector 36.

The energy state of at least a portion of the holmium ions at the $^5I_6$ level then non-radiatively decays down to the $^5I_7$ level. as represented by a wavy vector 38. In a second transfer of energy from the infrared pumping radiation to the activator ions, the energy state of at least some of the holmium activator ions at the $^5I_7$ level is raised to the $^5I_4$ level, as represented by a vector 40. The energy state of at least a portion of the holmium ions at the $^5I_4$ level then non-radiatively decays down to the $^5I_5$ level, as represented by a wavy vector 42. In a third transfer of energy from the infrared pumping radiation to the activator ions, the energy state of at least a portion of the holmium ions at the $^5I_5$ level is then raised to the $^5S_2$ level, as represented by a vector 44. The energy state of at least a portion of the holmium ions at the $^5S_2$ level then radiatively decays, thereby producing the shorter wavelength radiation. If this radiative decay is occurs down to the $^5I_8$ ground level, as represented by a vector 46, the wavelength of the radiation so developed is approximately 550 nanometers.

Figure 4:
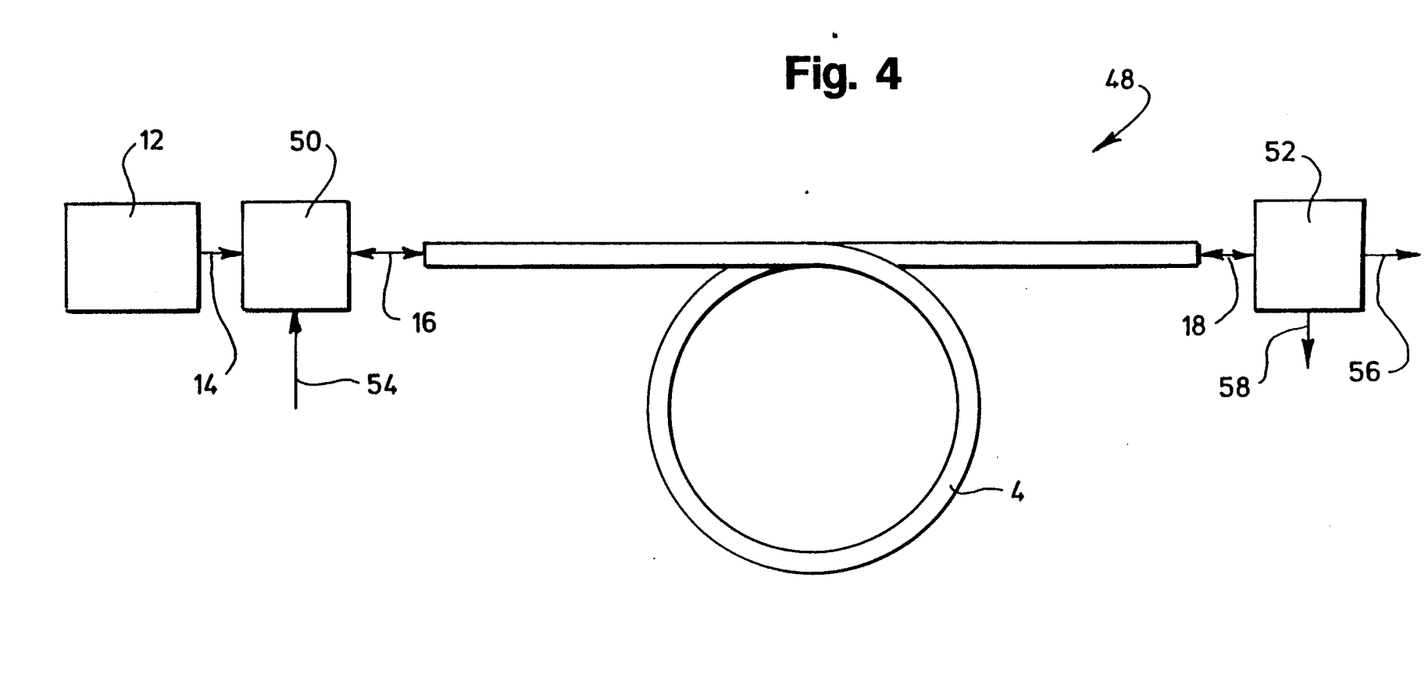
FIG. 4 is a schematic diagram of a laser amplifier system that is suitable for incorporating the present invention.

FIG. 4 is a schematic diagram of a laser amplifier system 48 according to the invention. In this embodiment, the amplifier system 48 utilizes the means for circulating 4 and the pumping source 12 described for the laser source system 2 in connection with FIG. 1, but the means for recirculating 6, the reflector 8, and the output coupler 10 are replaced by an input wavelength division multiplexer (WDM) 50 and an output wavelength division multiplexer (WDM) 52.

The amplifier system 48 receives substantially coherent, relatively short wavelength input radiation to be amplified on an input optical path 54 that is directed to a short wavelength input of the WDM 50. The infrared radiation from the pumping source 12 on the optical path 14 is directed to a long wavelength input of the WDM 50. The wavelength division operation of the WDM 50 allows the two wavelengths to be combined on the optical path 16 to the means for circulating 4 without crossing one input to another. Therefore, although the two wavelengths are combined within the means for circulating 4, they remain isolated at the respective inputs of the WDM 50.

As the two wavelengths circulate through the means for circulating 4, the infrared radiation from the pumping source 12 raises the energy state of at least a portion of the activator ions in the means for circulating 4 to the highest energy level as described for the laser system 2 described above in connection with FIG. 1, and the input radiation to be amplified stimulates at least a portion of the activator ions with energy states at the highest level to radiatively decay, so that the radiation produced by this decay is in phase with the input radiation, thereby producing an amplified output radiation.

The amplified output radiation and the infrared pumping radiation are directed to an input of the WDM 52 along the optical path 18 after they exit the means for circulating 4. The WDM 52 separates the two different wavelengths so that the amplified output radiation exits the WDM 52 on a short wavelength output optical path 56 and the infrared pumping radiation is dumped on a long wavelength output path 58. The activator ions may be thulium or holmium, as described above for the laser source system 2 in connection with FIG. 1, to amplify corresponding wavelengths of input radiation to be amplified, that is, approximately 480 or 650 nanometers with thulium and 550 nanometers with holmium.

In a specific implementation of the invention, the laser system 2 comprises a neodymium YAG laser for the pumping source 12, and the neodymium YAG laser is adjusted to enhance its output at the 1112, 1116 and 1123 nanometer wavelength lines of its output spectrum and to suppress the 1064 and 1074 nanometer wavelength lines of its output spectrum. The means for circulating 4 comprises an IRguide ® SM [2.9] (Tm3+1000 Yb3+4000) 6/125-10, Fiber Number 91213/1331, manufactured by Le Verre Fluore, Vern/Seiche, Brittarny, France. This fiber is fluoride-containing ZBLAN optical fiber doped with thulium. In fact, the core of the fiber is doped with approximately 1000 ppm of trivalent thulium ions, and the core has a numerical aperture of approximately 0.11. The core is also doped with approximately 4000 ppm of trivalent ytterbium ions, although ytterbium is not needed for implementation of the invention, and in fact its presence may be detrimental to its operation. The core is approximately 6 micrometers in diameter and the cladding is approximately 125 micrometers in diameter.

The reflector 8 is highly reflective for wavelengths in the range of approximately 460 to 510 nanometers, and highly transmissive for wavelengths in the range of approximately 1080 to 1300 nanometers. The output coupler 10 is approximately 95 percent transmissive for wavelengths in the range of approximately 475 to 485 nanometers.

Although the small numerical aperture and the presence of ytterbium are believed to be detrimental to the upconversion efficiency of the laser source system 2 in this implementation, never the less an output of approximately 24 milliwatts of substantially coherent radiation at a wavelength of approximately 480 nanometers is developed with approximately 160 milliwatts of infrared pumping radiation is absorbed when the neodymium laser pumping source 12 is tuned to approximately 1120 nanometers. When so tuned, the neodymium laser pumping source 12 actually has substantial output at three different wavelengths, specifically, approximately 1112, 1116 and 1123 nanometers. Better efficiency is expected with a pumping source 12 that provides substantial output at approximately 1200 nanometers. For example, the pumping source 12 may comprise a chromium Fosterite laser tuned to approximately 1200 nanometers or a holmium laser tuned to approximately 1200 nanometers.

Thus there has been described herein methods and apparatus for generating and amplifying relatively short wavelength optical radiation with energy provided by longer wavelength pumping radiation with an upconversion laser system that uses solid state components throughout and achieves such operation with a continuous or quasi-continuous pumping source using successive energy transfers between the pumping radiation and activator in the host of the lasant upcinversion material under ordinary ambient operating conditions. It will be understood that various changes in the details, materoals, steps and arrangements of parts that have been described and illustrated above in order to explain the nature of the invention may be made by those of ordinary skill in the art within the principle and scope of the present invention as expressed in the appended claims.

What is claimed is:

1. An upconversion process for generating sustained, relatively short wavelength, substantially coherent radiation in the optical spectrum from energy supplied by relatively long infrared radiation under ambient operating conditions, comprising the steps of:

circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level;

recirculating radiation that has a wavelength substantially shorter than said infrared radiation from said active lasant material that is produced by the radiative decay of the energy state of said activator ions in said highest level back to said ground level to stimulate development of relatively short wavelength coherent radiation; and extracting at least said a portion of said relatively short wavelength coherent radiation that passes through said lasant material.

2. The process set forth in claim 1, further comprising the step of selecting said host from the group comprising optical fibers.

3. The process set forth in claim 1, further comprising the step of selecting said host from the group comprising fluoride, telluride and germanate-containing optical fibers.

4. The process set forth in claim 1, further comprising the step of selecting said host from the group comprising fluoride-containing optical fibers.

5. The process set forth in claim 1, further comprising the step of selecting said activator ions from the group of thulium and holmium activator ions.

6. The process set forth in claim 1, further comprising the step of selecting said activator ions as thulium ions.

7. The process set forth in claim 1, wherein said step of circulating comprises circulation that provides three successive energy transfers from said infrared radiation to said activator ions to increase their energy state from said ground level to said highest level.

8. The process set forth in claim 7, further comprising the step of selecting trivalent thulium ions as said activator ions, and wherein said step of circulating further comprises the steps of:
   transferring energy in a first energy transfer from said infrared radiation to at least a portion of said thulium ions to raise their energy state to a first intermediate energy level from a ground level;
   transferring energy in a second energy transfer from said infrared radiation to at least a portion of said thulium ions to raise their state from said first intermediate energy level to a second intermediate energy level that is higher than said first intermediate energy level; and
   transferring energy in a third energy transfer from said infrared radiation to at least a portion of said thulium ions from said second intermediate energy level to said highest energy level that is higher than said second intermediate level.

9. The process set forth in claim 8, wherein the energy state of said thulium ions is $^3H_6$ at said ground level, $^3F_4$ at said first intermediate level, $^3H_4$ at said second intermediate level, $^1G_4$ at said highest level, said first transferring step comprises raising said thulium ions from the $^3H_6$ ground level to the $^3H_5$ level, wherein at least a portion of said thulium ions non-radiatively decay from the $^3H_5$ level to the $^3F_4$ level, said second transferring step comprises raising at least a portion of said thulium ions from the $^3F_4$ level to the $^3F_3$ level, wherein at least a portion of said thulium ions non-radiatively decay from the $^3F_3$ level to the $^3H_4$ level and said third transferring step comprises raising at least a portion of said thulium ions from the $^3H_4$ level to the $^1G_4$ level.

10. The process set forth in claim 9, wherein said step of extracting radiation from said lasant material comprises the extraction of radiation resulting from the radiative decay of the energy state of said thulium ions from the $^1G_4$ level to the $^3H_6$ level.

11. The process set forth in claim 9, wherein said step of extracting radiation comprises extraction of radiation having a wavelength of approximately 480 nanometers.

12. The process set forth in claim 9, wherein said step of extracting radiation from said lasant material comprises the extraction of radiation resulting from the radiative decay of the energy state of said thulium ions from the $^1G_4$ level to the $^3F_4$ level.

13. The process set forth in claim 9, wherein said step of extracting radiation comprises extraction of radiation having a wavelength of approximately 650 nanometers.

14. The process set forth in claim 7, further comprising the step of selecting trivalent holmium ions as said activator ions, and wherein said step of circulating further comprises the steps of:
   transferring energy in a first energy transfer from said infrared radiation to at least a portion of said holmium ions to raise their energy state to a first intermediate energy level from a ground level;
   transferring energy in a second energy transfer from said infrared radiation to at least a portion of said holmium ions to raise their state from said first intermediate energy level to a second intermediate energy level that is higher than said first intermediate energy level; and
   transferring energy in a third energy transfer from said infrared radiation to at least a portion of said holmium ions from said second intermediate energy level to said highest energy level that is higher than said second intermediate level.

15. The process set forth in claim 14, wherein the energy state of said holmium ions is $^5I_8$ at said ground level, $^5I_7$ at said first intermediate level, $^5I_5$ at said second intermediate level, $^5S_2$ at said highest level, said first transferring step comprises raising said holmium ions from the $^5I_8$ ground level to the $^5I_6$ level, wherein at least a portion of said holmium ions non-radiatively decay from the $^5I_6$ level to the $^5I_7$ level, said second transferring step comprises raising at least a portion of said holmium ions from the $^5I_7$ level to the $^5I_4$ level, wherein at least a portion of said holmium ions non-radiatively decay from the $^5I_4$ level to the $^5I_5$ level and said third transferring step comprises raising at least a portion of said holmium ions from the $^5I_5$ level to the $^5S_2$ level.

16. The process set forth in claim 15, wherein said step of extracting radiation from said lasant material comprises the extraction of radiation resulting from the radiative decay of the energy state of said holmium ions from the $^5S_2$ level to the $^5I_8$ level.

17. The process set forth in claim 15, wherein said step of extracting radiation comprises extraction of radiation having a wavelength of approximately 550 nanometers.

18. An upconversion process for amplifying sustained, relatively short wavelength, substantially coherent radiation in the optical spectrum from energy supplied by relatively long infrared radiation under ambient operating conditions, comprising the steps of:
   circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level;
   injecting relatively coherent radiation that has a wavelength substantially shorter than said infrared radiation into said active lasant material to stimulate production of additional relatively short wavelength coherent radiation that is produced by the radiative decay of the energy state of said activator ions in said highest level back to said ground level; and
   extracting said relatively short wavelength coherent radiation that passes through said lasant material.

19. The process set forth in claim 18, further comprising the step of selecting said host from the group comprising optical fibers.

20. The process set forth in claim 18, further comprising the step of selecting said host from the group comprising fluoride, telluride and germanate-containing optical fibers.

21. The process set forth in claim 18, further comprising the step of selecting said host from the group comprising fluoride-containing optical fibers.

22. The process set forth in claim 18, further comprising the step of selecting said activator ions from the group of thulium and holmium activator ions.

23. The process set forth in claim 18, further comprising the step of selecting said activator ions as thulium ions.

24. The process set forth in claim 18, wherein said step of circulating comprises circulation that provides three successive energy transfers from said infrared radiation to said activator ions to increase their energy state from said ground level to said highest level.

25. The process set forth in claim 24, further comprising the step of selecting trivalent thulium ions as said activator ions, and wherein said step of circulating further comprises the steps of:
transferring energy in a first energy transfer from said infrared radiation to at least a portion of said thulium ions to raise their energy state to a first intermediate energy level from a ground level;
transferring energy in a second energy transfer from said infrared radiation to at least a portion of said thulium ions to raise their state from said first intermediate energy level to a second intermediate energy level that is higher than said first intermediate energy level; and
transferring energy in a third energy transfer from said infrared radiation to at least a portion of said thulium ions from said second intermediate energy level to said highest energy level that is higher than said second intermediate level.

26. The process set forth in claim 25, wherein the energy state of said thulium ions is $^3H_6$ at said ground level, $^3F_4$ at said first intermediate level, $^3H_4$ at said second intermediate level, $^1G_4$ at said highest level, said first transferring step comprises raising said thulium ions from the $^3H_6$ ground level to the $^3H_5$ level, wherein at least a portion of said thulium ions non-radiatively decay from the $^3H_5$ level to the $^3F_4$ level, said second transferring step comprises raising at least a portion of said thulium ions from the $^3F_4$ level to the $^3F_3$ level, wherein at least a portion of said thulium ions non-radiatively decay from the $^3F_3$ level to the $^3H_4$ level and said third transferring step comprises raising at least a portion of said thulium ions from the $^3H_4$ level to the $^1G_4$ level.

27. The process set forth in claim 26, wherein said step of extracting radiation from said lasant material comprises the extraction of radiation resulting from the radiative decay of the energy state of said thulium ions from the $^1G_4$ level to the $^3H_6$ level.

28. The process set forth in claim 26, wherein said step of extracting radiation comprises extraction of radiation having a wavelength of approximately 480 nanometers.

29. The process set forth in claim 26, wherein said step of extracting radiation from said lasant material comprises the extraction of radiation resulting from the radiative decay of the energy state of said thulium ions from the $^1G_4$ level to the $^3F_4$ level.

30. The process set forth in claim 26, wherein said step of extracting radiation comprises extraction of radiation having a wavelength of approximately 650 nanometers.

31. The process set forth in claim 24, further comprising the step of selecting travalent holmium ions as said activator ions, and wherein said step of circulating further comprises the steps of:
transferring energy in a first energy transfer from said infrared radiation to at least a portion of said holmium ions to raise their energy state to a first intermediate energy level from a ground level;
transferring energy in a second energy transfer from said infrared radiation to at least a portion of said holmium ions to raise their state from said first intermediate energy level to a second intermediate energy level that is higher than said first intermediate energy level; and
transferring energy in a third energy transfer from said infrared radiation to at least a portion of said holmium ions from said second intermediate energy level to said highest energy level that is higher than said second intermediate level.

32. The process set forth in claim 31, wherein the energy state of said holmium ions is $^5I_5$ at said ground level, $^5I_7$ at said first intermediate level, $^5I_5$ at said second intermediate level, $^5S_2$ at said highest level, said first transferring step comprises raising said holmium ions from the $^5I_8$ ground level to the $^5I_6$ level, wherein at least a portion of said holmium ions non-radiatively decay from the $^5I_6$ level to the $^5I_7$ level, said second transferring step comprises raising at least a portion of said holmium ions from the $^2I_7$ level to the $^5I_4$ level, wherein at least a portion of said holmium ions non-radiatively decay from the $^5I_4$ level to the $^5I_5$ level and said third transferring step comprises raising at least a portion of said holmium ions from the $^5I_5$ level to the $^5S_2$ level.

33. The process set forth in claim 32, wherein said step of extracting radiation from said lasant material comprises the extraction of radiation resulting from the radiative decay of the energy state of said holmium ions from the $^5S_2$ level to the $^5I_8$ level.

34. The process set forth in claim 32, wherein said step of extracting radiation comprises extraction of radiation having a wavelength of approximately 550 nanometers.

35. An upconversion system for generating sustained, relatively short wavelength, substantially coherent radiation in the optical spectrum from energy supplied by relatively long infrared radiation under ambient operating conditions, comprising:
means for circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level;
means for recirculating radiation that has a wavelength substantially shorter than said infrared radiation from said active lasant material that is produced by the radiative decay of the energy state of said activator ions in said highest level back to said ground level to stimulate development of relatively short wavelength coherent radiation; and means for extracting at least said a portion of said relatively short wavelength coherent radiation that passes through said lasant material.

36. The system set forth in claim 35, wherein said means for circulating comprises on optical fiber.

37. The system set forth in claim 35, wherein said means for circulating comprises a thulium-doped fluoride-containing optical fiber.

38. The system set forth in claim 35, wherein said means for circulating comprises a holmium-doped fluoride-containing optical fiber.

39. The system set forth in claim 35, wherein said activator ions comprise thulium ions and said means for circulating transfers energy in a first energy transfer from said infrared radiation to at least a portion of said thulium ions to raise their energy state to a first intermediate energy level from a ground level, transfers energy in a second energy transfer from said infrared radiation to at least a portion of said thulium ions to raise their state from said first intermediate energy level to a second intermediate energy level that is higher than said first intermediate energy level, and transfers energy in a third energy transfer from said infrared radiation to at least a portion of said thulium ions from said second intermediate energy level to said highest energy level that is higher than said second intermediate level.

40. The system set forth in claim 39, wherein the energy state of said thulium ions is $^3H_6$ at said ground level, $^3F_4$ at said first intermediate level, $^3H_4$ at said second intermediate level, $^1G_4$ at said highest level, said first energy transfer comprises raising said thulium ions from the $^3H_6$ ground level to the $^3H_5$ level, wherein at least a portion of said thulium ions non-radiatively decay from the $^3H_5$ level to the $^3F_4$ level, said second energy transfer comprises raising at least a portion of said thulium ions from the $^3F_4$ level to the $^3F_3$ level, wherein at least a portion of said thulium ions non-radiatively decay from the $^3F_3$ level to the $^3H_4$ level and said third energy transfer comprises raising at least a portion of said thulium ions from the $^3H_4$ level to the $^1G_4$ level.

41. The system set forth in claim 40, wherein said means for extracting radiation from said lasant material comprises means for extraction of radiation resulting from the radiative decay of the energy state of said thulium ions from the $^1G_4$ level to the $^3H_6$ level.

42. The system set forth in claim 40, wherein said means for extracting radiation comprises means for extraction of radiation having a wavelength of approximately 480 nanometers.

43. The system set forth in claim 40, wherein said means for extracting radiation from said lasant material comprises means for extraction of radiation resulting from the radiative decay of the energy state of said thulium ions from the $^1G_4$ level to the $^3F_4$ level.

44. The system set forth in claim 40, wherein said means for extracting radiation comprises means for extraction of radiation having a wavelength of approximately 650 nanometers.

45. The system set forth in claim 35, wherein said activator ions are holmium ions, and wherein said means for circulating transfers energy in a first energy transfer from said infrared radiation to at least a portion of said holmium ions to raise their energy state to a first intermediate energy level from a ground level, transfers energy in a second energy transfer from said infrared radiation to at least a portion of said holmium ions to raise their state from said first intermediate energy level to a second intermediate energy level that is higher than said first intermediate energy level and transfers energy in a third energy transfer from said infrared radiation to at least a portion of said holmium ions from said second intermediate energy level to said highest energy level that is higher than said second intermediate level.

46. The system set forth in claim 45, wherein the energy state of said holmium ions is $^5I_8$ at said ground level, $^5I_7$ at said first intermediate level, $^5I_5$ at said second intermediate level, $^5S_2$ at said highest level, said first transfer of energy comprises raising said holmium ions from the $^5I_8$ ground level to the $^5I_6$ level, wherein at least a portion of said holmium ions non-radiatively decay from the $^5I_6$ level to the $^5I_7$ level, said second transfer of energy comprises raising at least a portion of said holmium ions from the $^5I_7$ level to the $^5I_4$ level, wherein at least a portion of said holmium ions non-radiatively decay from the $^5I_4$ level to the $^5I_5$ level and said third transfer of energy comprises raising at least a portion of said holmium ions from the $^5I_5$ level to the $^5S_2$ level.

47. The system set forth in claim 46, wherein said means for extracting radiation from said lasant material comprises means for extraction of radiation resulting from the radiative decay of the energy state of said holmium ions from the $^5S_2$ level to the $^5I_8$ level.

48. The system set forth in claim 46, wherein said step of extracting radiation comprises extraction of radiation having a wavelength of approximately 650 nanometers.

49. An upconversion system for amplifying sustained, relatively short wavelength, substantially coherent radiation in the optical spectrum from energy supplied by relatively long infrared radiation under ambient operating conditions, comprising:

means for circulating substantially single band infrared radiation that has a spectrum within the range of approximately 1080 to 1300 nanometers in wavelength into an active lasant material comprising a glass host and an activator comprising a concentration of rare earth activator ions in said host to provide successive transfers of energy from said infrared radiation to said activator ions to raise their energy state from a ground level to a highest level;

means for injecting relatively coherent radiation that has a wavelength substantially shorter than said infrared radiation into said active lasant material to stimulate production of additional relatively short wavelength coherent radiation that is produced by the radiative decay of the energy state of said activator ions in said highest level back to said ground level; and means for extracting said relatively short wavelength coherent radiation that passes through said lasant material.

50. The system set forth in claim 49, wherein said means for circulating comprises an optical fiber.

51. The system set forth in claim 49, wherein said means for circulating comprises a thulium-doped fluoride-containing optical fiber.

52. The system set forth in claim 49, wherein said means for circulating comprises a holmium-doped fluoride-containing optical fiber.

53. The system set forth in claim 49, wherein said means for circulating comprises means for transferring three successive energy transfers from said infrared radiation to said activator ions to increase their energy state from said ground level to said highest level.

54. The system set forth in claim 53, wherein said activator ions are trivalent thulium ions and wherein said means for circulating transfers energy in a first energy transfer from said infrared radiation to at least a portion of said thulium ions to raise their energy state to a first intermediate energy level from a ground level, transfers energy in a second energy transfer from said infrared radiation to at least a portion of said thulium ions to raise their state from said first intermediate energy level to a second intermediate energy level that is higher than said first intermediate energy level and transfers energy in a third energy transfer from said infrared radiation to at least a portion of said thulium ions from said second intermediate energy level to said highest energy level that is higher than said second intermediate level.

55. The system set forth in claim 54, wherein the energy state of said thulium ions is $^3H_6$ at said ground level, $^3F_4$ at said first intermediate level, $^3H_4$ at said second intermediate level, $^1G_4$ at said highest level, said first energy transfer comprises raising said thulium ions from the $^3H_6$ ground level to the $^3H_5$ level, wherein at least a portion of said thulium ions non-radiatively decay from the $^3H_5$ level to the $^3F_4$ level, said second energy transfer comprises raising at least a portion of said thulium ions from the $^3F_4$ level to the $^3F_3$ level, wherein at least a portion of said thulium ions non-radiatively decay from the $^3F_3$ level to the $^3H_4$ level and said third energy transfer comprises raising at least a portion of said thulium ions from the $^3H_4$ level to the $^1G_4$ level.

56. The system set forth in claim 55, wherein said means for extracting radiation from said lasant material comprises means for extraction of radiation resulting from the radiative decay of the energy state of said thulium ions from the $^1G_4$ level to the $^3H_6$ level.

57. The system set forth in claim 55, wherein said means for extracting radiation comprises means for extraction of radiation having a wavelength of approximately 480 nanometers.

58. The system set forth in claim 55, wherein said means for extracting radiation from said lasant material comprises means for extraction of radiation resulting from the radiative decay of the energy state of said thulium ions from the $^1G_4$ level to the $^3F_4$ level.

59. The system set forth in claim 55, wherein said means for extracting radiation comprises means for extraction of radiation having a wavelength of approximately 650 nanometers.

60. The system set forth in claim 53, wherein said activator ions are trivalent holmium ions and wherein said means for circulating transfers energy in a first energy transfer from said infrared radiation to at least a portion of said holmium ions to raise their energy state to a first intermediate energy level from a ground level transfers energy in a second energy transfer from said infrared radiation to at least a portion of said holmium ions to raise their state from said first intermediate energy level to a second intermediate energy level that is higher than said first intermediate energy level and transfers energy in a third energy transfer from said infrared radiation to at least a portion of said holmium ions from said second intermediate energy level to said highest energy level that is higher than said second intermediate level.

61. The system set forth in claim 60, wherein the energy state of said holmium ions is $^5I_8$ at said ground level, $^5I_7$ at said first intermediate level, $^5I_5$ at said second intermediate level, $^5S_2$ at said highest level, said first energy transfer comprises raising said holmium ions from the $^5I_8$ ground level to the $^5I_6$ level, wherein at least a portion of said holmium ions non-radiatively decay from the $^5I_6$ level to the $^5I_7$ level, said second energy transfer comprises raising at least a portion of said holmium ions from the $^5I_7$ level to the $^5I_4$ level, wherein at least a portion of said holmium ions non-radiatively decay from the $^5I_4$ level to the $^5I_5$ level and said third energy transfer comprises raising at least a portion of said holmium ions from the $^5I_5$ level to the $^5S_2$ level.

62. The system set forth in claim 61, wherein said means for extracting radiation from said lasant material comprises means for extraction of radiation resulting from the radiative decay of the energy state of said holmium ions from the $^5S_2$ level to the $^5I_8$ level.

63. The system set forth in claim 61, wherein said means for extracting radiation comprises means for extraction of radiation
having a wavelength of approximately 650 nanometers.

* * * * *